United States Patent [19]

Ishikawa

[11] Patent Number: 4,976,523

[45] Date of Patent: Dec. 11, 1990

[54] METHOD OF ZOOMING IN A CAMERA AND DEVICE FOR USE IN SUCH METHOD

[75] Inventor: Yoshihiro Ishikawa, Tokyo, Japan

[73] Assignee: Fuji Photo Film Co., Ltd., Kanagawa, Japan

[21] Appl. No.: 259,637

[22] Filed: Oct. 19, 1988

[30] Foreign Application Priority Data

Oct. 20, 1987 [JP] Japan ............................ 62-264227

[51] Int. Cl.$^5$ .............................................. G02B 15/00
[52] U.S. Cl. ................................... 350/429; 350/427; 350/320
[58] Field of Search ............... 350/429, 255, 320, 427, 350/430; 354/400, 403, 410, 199, 195.12, 402

[56] References Cited

U.S. PATENT DOCUMENTS 4,161,756 7/1979 Thomas ........................... 350/429
4,697,891 10/1987 Kawai ............................ 350/429

Primary Examiner—Bruce Y. Arnold
Assistant Examiner—Loha Ben
Attorney, Agent, or Firm—Sughrue, Mion, Zinn, Macpeak & Seas

[57] ABSTRACT

A zoom lens is disclosed which comprises a front lens group for collecting light as a first group, a magnification varying lens group for varying the magnification of an image as a second group, a compensator lens group for correcting defocussing and performing a focus adjustment as a third group, and a master lens group for allowing an image of an object to be formed on an image pickup plane. In the zoom lens, the compensator lens group is brought into contact with the compensator lens group positioned at the end of a tele photographing side and, with this state, these two lens groups are moved together to a wide photographing side. Thanks to this, in the tele side photography, a close-up picture taking of several cm can be realized.

6 Claims, 3 Drawing Sheets

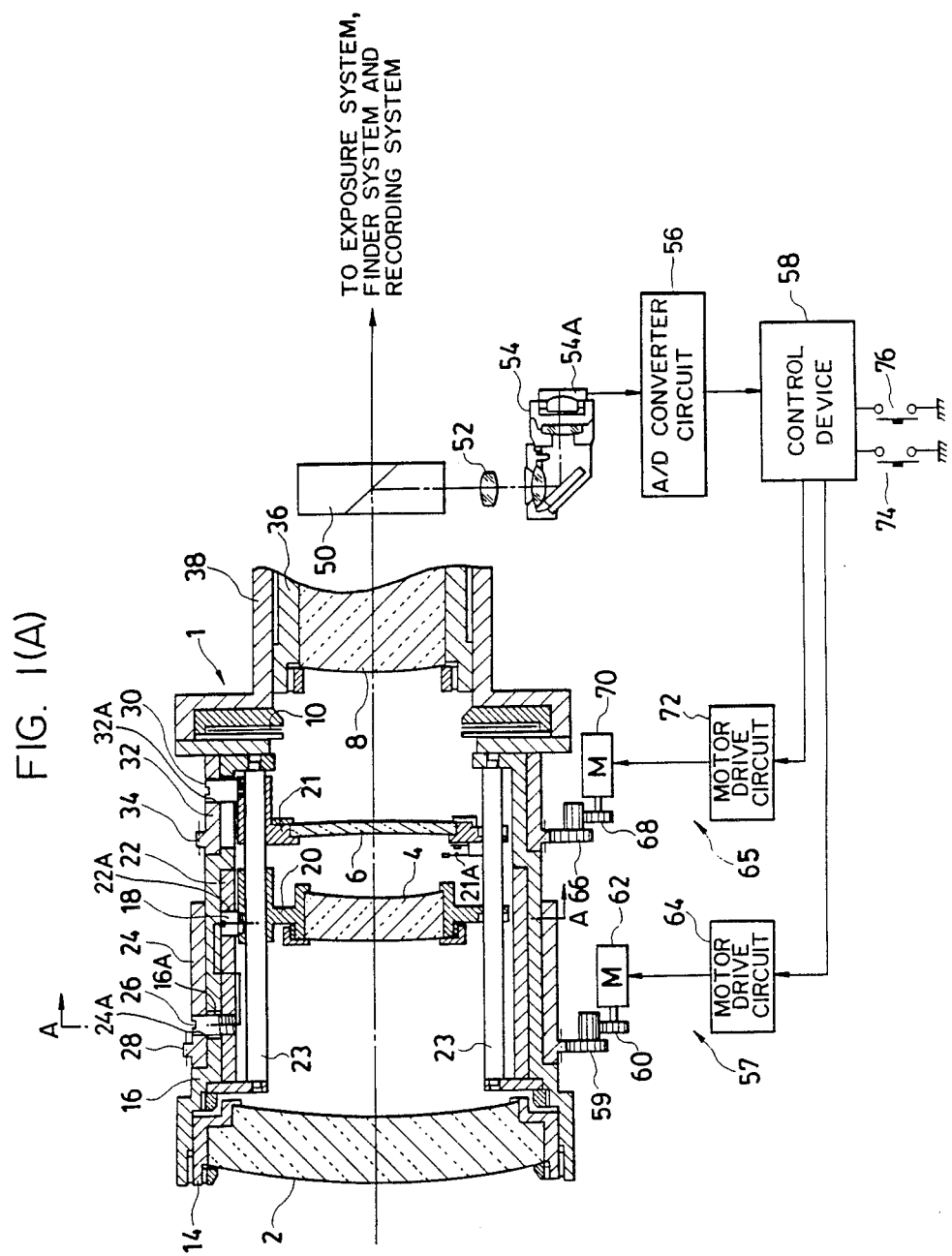

METHOD OF ZOOMING IN A CAMERA AND DEVICE FOR USE IN SUCH METHOD

BACKGROUND OF THE INVENTION

1. Field of the Invention

The present invention relates to a method of driving a zoom lens in a camera and a device for use in such method and, in particular, to a method of driving a zoom lens by means of an inner-focus type of zoom lens in a camera and a device for use in such method.

2. Description of the Related Art

Ordinarily, in an inner-focus type of zoom lens for use in a camera, in order to perform a zooming operation, part of a lens system constituting the zoom lens is moved to vary a focal distance. A typical example of such zoom lens is a 4-group type of zoom lens. The 4-group type of zoom lens comprises a front lens group for collecting light as a first group, a magnification varying lens group for varying the magnification of an image to be formed as a second group, a compensator lens group for correcting de-focussing and performing a focus adjustment as a third group, and a master lens group having a stop diaphragm for forming an image of an object on an image pickup plane with a given intensity of illumination. In zooming, the magnification varying lens group and the compensator lens group, among the above-mentioned four lens groups, are moved separately by means of their associated cams.

In other words, the second lens group or magnification varying lens group and the third lens group or compensator lens group are moved to vary the focal distance for zooming, so that the image of the object can be formed on the image pickup plane.

However, in the above-mentioned inner-focus type of zoom lens, a space within which the third lens group or compensator lens group can be moved may be limited by the position of the second lens group or magnification varying lens group. In other words, in the wide photographing operation of the zoom lens, because the second lens group or magnification varying lens group is located at a forward position in the zoom lens, the space for the movement of the third or compensation lens group is wide, while in the tele-photographing operation of the zoom lens the space for the movement of the third or compensator lens group is narrow because the second or magnification varying lens group is located at a rearward position. Therefore, on the wide side of the zoom lens the focussing of the object is possible up to a position just before the first lens group or front lens group, but, on the contrary, on the tele side of the zoom lens the focussing is possible only up to substantially 70~90 cm and thus the object will be out of focus in a close-up (for example, several centimeters) photography. For this reason, if a photographer mistakes that the focussing in the tele photographing operation is possible similarly as in the wide photographing operation and takes a picture of the object in a close-up condition, there is a possibility that the picture may be out of focus.

SUMMARY OF THE INVENTION

The present invention aims at eliminating the drawbacks found in the above-mentioned prior art methods and devices.

Accordingly, it is an object of the invention to provide a method of driving a zoom lens in a camera and a device for use in such method in which a close-up photography on the tele side of a zoom lens can be achieved in a properly focussed state similarly as on the wide side of the zoom lens.

In order to accomplish the above object, according to the invention, there is provided an inner-focus type of zoom lens comprising a front lens group for collecting light, a magnification varying lens group for varying the magnification of an image of an object, a compensator lens group for correcting de-focussing and a master lens group for allowing the object image to be formed on a image pickup plane, wherein the magnification varying lens group and the compensator lens group are moved along the optic axis of the zoom lens between the front and master lens groups so as to be able to adjust the focal distance and focussing position of the zoom lens, characterized in that the magnification varying lens group and the compensator lens group are moved forwardly of the zoom lens while maintaining the interval between the magnification varying lens group and the compensator lens group in their tele-side-most positions in which the magnification varying lens group is located at a position of the longest focal distance and the compensator lens group is located at a position of the shortest focussing.

In the zoom lens according to the invention, the magnification varying lens group for varying the magnification of the object image and the compensator lens group for correcting de-focussing are moved forwardly along the optic axis of the zoom lens from their tele-side-most positions while maintaining a given interval therebetween.

Thanks to this, a close-up picture of the object can be taken even in the tele photographing operation as in the wide photographing operation with the object not being out of focus.

BRIEF DESCRIPTION OF THE DRAWINGS

The exact nature of this invention, as well as other objects and advantages thereof, will be readily apparent from consideration of the following specification relating to the accompanying drawings in which like reference characters designate the same or similar parts throughout the figures thereof and wherein:

FIG. 1 (B) is a section view taken along the line A—A in FIG. 1 (A);

DETAILED DESCRIPTION OF THE PREFERRED EMBODIMENT

Figure 1B:
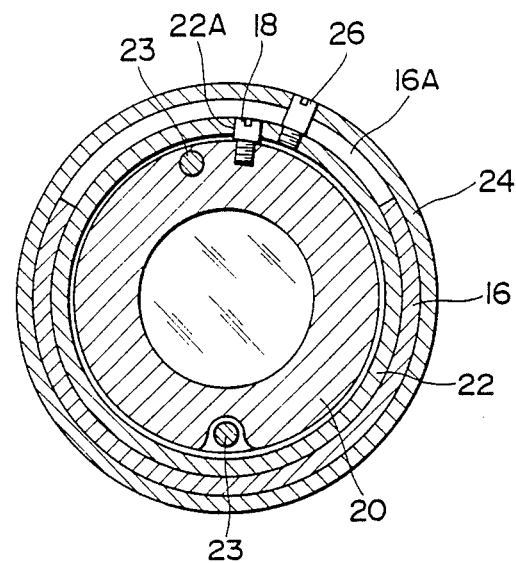
FIG. 1 (A) is a view to show the whole structure of a camera to which a zoom lens according to the invention is applied.

Detailed description will hereunder be given of the preferred embodiments of method and device for driving a zoom lens in a camera according to the present invention with reference to be accompanying drawings.

Referring first to FIG. 1 (A), there is shown the whole structure of a camera to which a zoom lens according to the invention is applied. In FIG. 1 (A), the camera comprises a zoom lens system which the light of an object enters, a focus detecting system for taking out a part of the object light from the zoom lens system to detect the state of focussing of the image of the object, a drive system for moving the lenses of the zoom lens system in a direction of the optic axis of the zoom lens system, a control system for controlling the drive system in accordance with a detecting signal from the focus detecting system, an exposure system for detecting the brightness of the object light, a finder system for indicating a photograph range to determine a picture composition, and a recording system for recording the object image.

The zoom lens system is composed of a zoom lens 1 of an inner focus type. The zoom lens 1 comprises a first lens group 2 or a group of front lenses for collecting the light of the object, a second lens group 4 or a group of magnification varying lenses for varying the focal distance of the zoom lens to vary the magnification of the image, a third lens group 6 or a group of compensator lenses for correcting de-focussing for proper focussing, and a fourth lens group 8 or a group of master lenses for allowing the object image to be formed on an image pickup plane with a given intensity of illumination. Also, there is disposed a stop diaphragm 10 on the incident light side of the compensator lens group 8 and there is disposed a beam splitter 50 of the focus detecting system within the master lens group 8, respectively.

The front lens group 2 is supported by a support frame 14 and the support frame 14 is in turn held on the inside of a main lens barrel 16.

The magnification varying lens group 4 is supported by a support frame 20. The support frame 20 is guided by two guide rods 23, 23 and is provided with a pin 18 projecting therefrom. The pin 18 of the support frame 20 is fitted into a grooved cam 22A which is formed in a zoom cam cylinder 22. Although not shown, the grooved cam 22A constitutes a part of a spiral configuration. The zoom cam cylinder 22 is provided with a pin 26 facing outwardly. The pin 26 is inserted through a peripheral groove 16A in the main lens barrel 16 and is further fitted into a hole 24A formed in a zoom ring 24. Thanks to such structure, if the zoom ring 24 is rotated, then the zoom cam cylinder 22 is rotated, so that the magnification varying lens group 4 can be moved in the optic axis direction by means of the grooved cam 22A in the zoom cam cylinder 22.

In the movement path of the support frame 20, there are provided stoppers (at the two ends of the peripheral groove 16A shown in FIG. 1(B)) to determine the wide and tele extreme ends respectively and thus these stoppers determine the movement range of the magnification varying lens group 4. Also, the zoom ring 24 is formed with a gear 28 in the external peripheral wall thereof.

The compensator lens group 6 is supported by a support frame 21. The support frame 21 is guided by guide rods 23, 23 and is also provided on the outside thereof with a projecting pin 30. The pin 30 of the support frame 21 is fitted into a grooved cam 32A formed in a focus ring 32. With such construction, if the focus ring 32 is rotated, then the compensator lens group 6 is moved in the optic axis direction. On the side surface of the support frame 21, there is provided a microswitch 21A to detect that the support frame 20 approaches and abuts against the support frame 21, the switch state of which is detected by a focus control device 58 provided in the control system. Also, the focus ring 32 is formed with a gear 34 in the outer peripheral wall thereof.

The master lens group 8 is supported by a support frame 36 which is abutted and held against the inside of an outer cylinder 38. Also, the stop diaphragm 10 has an aperture to control the amount of light and the size of the aperture can be adjusted by a servo motor in the exposure system.

The focus detecting system comprises a beam splitter 50, an image forming lens 52, an AF (Auto Focus) sensor module 54, and an A/D converter circuit 56. The beam splitter 50 branches off a part of the incident light and allows it to be received by the AF sensor module 54 through the image forming lens 52. The AF sensor module 54 is provided on the light receiving surface thereof with a CCD line sensor 54A which is composed of 2 kinds of sensors having different light paths from each other. The respective sensors output electric signals having waveforms which correspond to the brightnesses of the object image formed on the light receiving surface of the AF sensor module 54. The A/D converter circuit 56 converts an output signal from the AF sensor module 54 to a digital signal, for example, of 8 bits.

The drive system is composed of two drive systems 57, 65 which respectively move the magnification varying lens group 4 and the compensator lens group 6 individually in the optic axis direction. The drive system 57 comprises a gear 59 meshable with a gear 28 formed on the zoom ring 24, a gear 60 of a small diameter meshable with the gear 59, a stepping motor 62 having its rotary shaft fixedly mounted to the center of the gear 60, and a motor drive circuit 64 which controls the driving of the stepping motor 62. The motor drive circuit 64 outputs a drive pulse of N phase to the stepping motor 62 in accordance with a control signal from the focus control device 58. Responsive to this, if the rotary shaft of the stepping motor 62 is rotated in a given direction, then the zoom ring 24 is rotated through the gears 58, 60, so that the magnification varying lens group 4 is moved according to the amount of rotation of the zoom ring 24.

The drive system 65 comprises a gear 66 meshable with a gear 34 in the focus ring 32, a gear 68 of a small diameter meshable with the gear 66, a stepping motor 70 having its rotary shaft fixedly mounted to the center of the gear 68, and a motor drive circuit 72 for controlling the driving of the stepping motor 70. The motor drive circuit 72 outputs a drive pulse of N phase to the stepping motor 70 in accordance with a control signal from the focus control device 58. Responsive to this, if the rotary shaft of the stepping motor 70 is rotated in a given direction, then the focus ring 32 is rotated in a given direction through the gears 66, 68, that the compensator lens group 6 is moved according to the amount of rotation of the focus ring 32.

The control system comprises a focus control device 58 for performing the focus adjustment of the zoom lens 1 and other controlling operations. The focus control device 58 checks the state of focussing of the object image in accordance with a correlation between the waveforms of the two output signals from the A/D converter circuit 56 in the focus detecting system and controls the motor drive circuit 72 according to the degree of de-focussing thereof so as to move the compensator lens group 6 to a given position. Also, to vary the magnification of the object image, the motor drive circuit 64 is controlled to thereby move the magnification varying lens group 4 in a given direction. The direction and amount of movement of the magnification varying lens group 4 are determined by operating a wide switch 74 for indicating the wide photographing operation and a tele switch 76 for indicating the tele photographing operation, both switches being connected to the focus control device 58.

Also, when the focus control device 58 detects that the wide switch 74 is depressed, it controls the drive system 57 such that the magnification varying lens group 4 is drawn out forwardly, that is, toward the wide photographing side while the wide switch is depressed. On the other hand, when detecting that the tele switch 76 is depressed, the focus control device 58 controls the drive system 65 such that the magnification varying lens group 4 is drawn back backwardly, that is, toward the tele photographing side during the depression of the tele switch.

Further, when the control device 58 detects that the microswitch for the compensator lens group 6 is close, it controls the drive systems 57 and 65 to move the magnification varying lens group 4 and the compensator lens group 6 at the same speed in the same direction (toward the wide or tele photographing side) so that the object image can be in focus on the image pickup plane. This is not removed until the movement of the magnification varying lens group 4 is caused to stop by the stopper at the tele extreme end and the compensator lens group 6 is separated from the magnification varying lens group 4 to thereby open the microswitch.

Next, description, will be given below of the operation of the camera including the zoom lens constructed in the above-mentioned manner. If the zoom lens 1 of the camera is directed to the object, then the light measurement for the focus control is initiated. In this operation, the AF sensor module 54 receives the light that enters through the beam splitter 50 and image forming lens 52, and accumulates the electric charges that correspond to the illumination distribution on the light receiving surface thereof. The electric charges accumulated on the light receiving surface are read out at a given clock frequency according to the drive signal that is output from the focus control device 58 and the output signal thereof is input to the A/D converter circuit 56. The focus control device 58 takes in a digital signal (CCD date) from the A/D converter circuit 56 and checks whether the object image is in focus or not in accordance with the digital signal. As a result of the check, when the object image is not in focus, then the focus control device 58 controls the motor drive circuit 72 such that the compensator lens group 6 is moved to a forwardly focussing side or a rearwardly focussing side by a given distance according to the amount of de-focussing thereof.

This operation is automatically carried out whenever the magnification varying lens group 4 is moved according to the operation of the wide switch 74 or tele switch 76 to vary the magnification of the image or whenever the distance from the object is varied.

Figure 2:
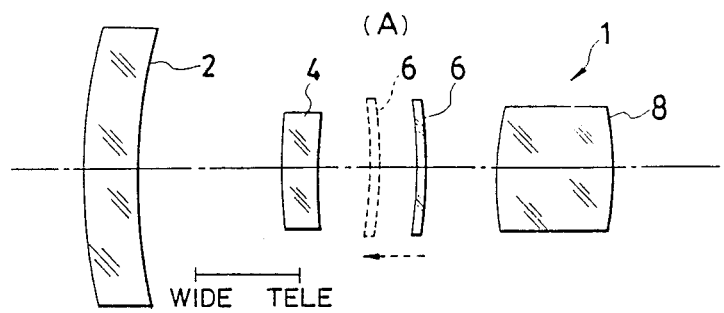
FIGS. 2(A) and 2(B) are an explanatory view to show how to move lenses in a tele photographing operation according to the invention; and, FIG. 3 is an explanatory view to show the operation of the zoom lens according to the invention.
Figure 2:
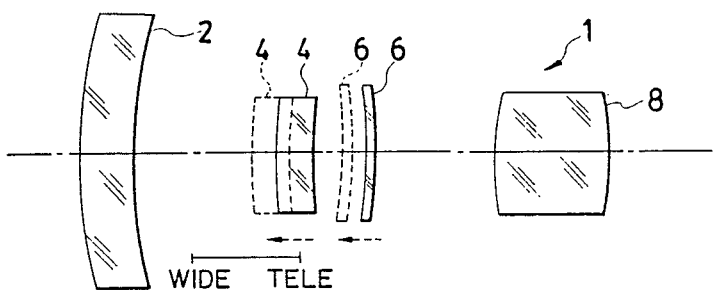

In the camera that can be operated in the above-mentioned manner, for example, if an operator continues to operate the tele switch 76, then the magnification varying lens group 4 is moved backwardly so that it is positioned at the tele extreme end. During this, if the camera is approached to the object, then the focus control device 58 performs a control operation to draw out the compensator lens group 6 forwardly so that the image of the object can be in focus (see FIG. 2(A)). This is shown by a straight line 90A in FIG. 3 and in the straight line 90A the focussing is performed only by the compensator lens group 6. When compensator lens group 6 is moved forward, the microswitch 21A for the compensator lens group 6 is abutted against the support frame 20 of the magnification varying lens group 4 and is then closed. This is shown by a point P in FIG. 3. When detecting that the microswitch 21A is closed, the focus control device 58 controls the motor drive circuits 64, 72 such that the object image will be in focus at the object distance, thereby moving the magnification varying lens group 4 and compensator lens group 6 to the wide photographing side at the same speed (see FIG. 2(B)). Also, if the operator approaches the camera toward the object and take a close-up picture thereof, then the focus control device 58 moves the magnification varying lens group 4 and compensator lens group 6 at the same speed to their focussing positions according to the detected amount of de-focussing. This movement control is continued until the front lens group 2 of the zoom lens 1 is approached up to a position of several cm to the object. This is shown by a straight line 90B in FIG. 3.

Figure 3:
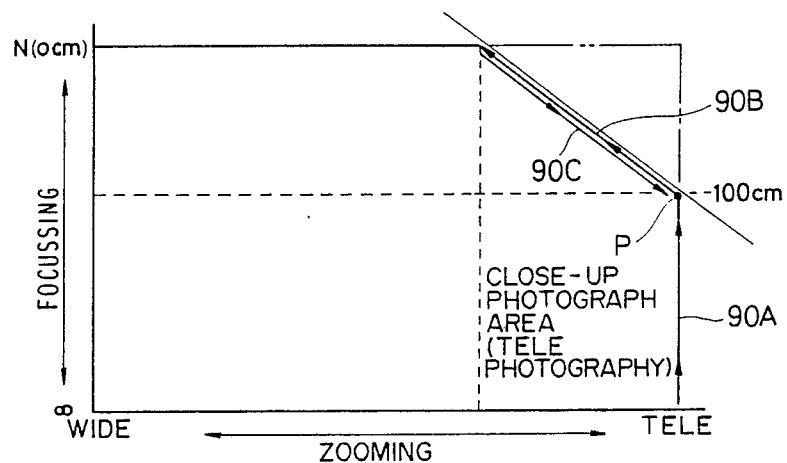

In this manner, for example, in a camera employing a zoom lens having the shortest photograph distance of about 100 cm in the tele photography, if the camera is approached further from the shortest photograph distance toward the object to take a close-up picture thereof, the magnification varying lens group 4 and compensator lens group 6 are moved on the optic axis a long a path designated by numeral 90 in FIG. 3, so that focussing can be achieved within the range of almost 0 (N) cm ~ 100 cm.

On the other hand, if the camera is moved away from the object, then the magnification varying lens group 4 and compensator lens group 6 are moved from the wide photograph side to the tele photograph side. This is shown by a straight line 90C. And, when the magnification varying lens group 4 is caused to stop its movement by the stopper at the tele side extreme end, then the microswitch 21A of the compensator lens group 6 in contact with the support frame 20 of the magnification varying lens group 4 is disengaged therefrom at the point P in FIG. 3 so that the microswitch 21A is opened. As a result of this, the focus control device 58 can perform the focussing control on the object of a given magnification according to the operations of the wide switch 74 and tele switch 76.

As described above, in the camera according to the present embodiment, if the camera is approached toward the object to take a close-up picture of the object in the tele photography, then, among the front lens group 2, magnification varying lens group 4, compensator lens group 6 and master lens group 8 of the zoom lens 1, the magnification lens group 4 and compensator lens group 6 are drawn out from the tele extreme end position toward the forward portion (namely, the wide end side) of the camera as the object distance is shortened, with a given interval being maintained between the two lens group.

In this manner, even in the tele photography, as in the wide photography, a close-up photography is possible and thus the focussing over the whole photograph range (0–∞) can be realized.

As discussed above, in the present embodiment, the rotational movements of the zoom ring 24 and focus ring 32 of the zoom lens 1 are carried out automatically. However, this is not limitative, but they can also be done manually. In this case, there is provided in the zoom lens 1 a movement mechanism which is able to draw out the magnification varying lens group 4 forwardly from the tele extreme end position together with the compensator lens group 6 while maintaining a given interval between the two lens groups. This enables the close-up photographing in the tele photography.

As has been described hereinbefore, in the zoom lens according to the present invention, since the magnification varying lenses for varying the magnification of the image of the object and the compensator lenses for correcting defocussing can be moved from the tele-sidemost position in the forward direction along the optic axis of the zoom lens while maintaining a given interval therebetween, a close-up photography in the tele photograph side can be realized in a properly focussed state, as in the wide side.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of driving a zoom lens comprising a front lens group for collecting light, a magnification varying lens group for varying the magnification of an image of an object, a compensator lens group for correcting defocussing and a master lens group for allowing said object image to be formed on an image pickup plane, in which said magnification varying lens group and said compensator lens group are moved on an optic axis between said front lens group and master lens group to be able to adjust the focal distance and focussing position of a zoom lens system, said method comprising the steps of moving said magnification varying lens group toward an end of a tele photographing side, moving said compensator lens group up to a position adjacent to said magnification varying lens group disposed at said tele photographing side end, and moving said magnification varying lens group and said compensator lens group together toward a wide photographing side with an interval therebetween being maintained constant so as to take a close-up picture of said object.

2. A method of driving a zoom lens as set forth in claim 1, further comprising the steps of moving said compensator lens group up to a position where it is brought into contact with a support frame of said magnification varying lens group and, with said contact therebetween being maintained, and moving said magnification varying lens group and said compensator lens group together toward said wide photographing side so as to take a close-up picture of said object.

3. A device for driving a zoom lens comprising a front lens group for collecting light, a magnification varying lens group for varying the magnification of an image of an object, a compensator lens group for correcting defocussing and a master lens group for allowing said object image to be formed on an image pickup plane, in which said magnification varying lens group and said compensator lens group are moved on an optic axis between said front lens group and master lens group to be able to adjust the focal distance and focussing position of a zoom lens system, said device comprising:
first drive means for moving said magnification varying lens group to an end of a tele photographing side or a wide photographing side;
switch means for sending said first drive means a drive signal to move said magnification varying lens group to said tele or wide photographing side;
second drive means for moving said compensator lens group to a position adjacent said magnification varying lens group;
automatic focussing means sending said second drive means a drive signal to correct de-focussing;
stopper means for determining an end of a moving range of said magnification varying lens group;
detecting means for detecting that said compensator lens group is moved up to said position adjacent said magnification varying lens group positioned at the end of said tele side; and,
control means, responsive to a signal from said detecting means, for moving said magnification varying lens group and said compensator lens group to said wide side with an interval therebetween being maintained constant.

4. A device for driving a zoom lens as set forth in claim 3, wherein said detecting means is a microswitch to detect that said compensator lens group is in contact with said magnification varying lens group.

5. A device for driving a zoom lens as set forth in claim 4, wherein said first drive means comprises first gear transmission means meshable with a gear in the outer periphery of a zoom ring, a first motor connected to said first gear transmission means, and a first motor drive circuit.

6. A device for driving a zoom lens as set forth in claim 5, wherein said second drive means comprises a second gear transmission means meshable with a gear in the outer periphery of a focus ring, a second motor connected to said second gear transmission means, and a second motor drive circuit.

* * * * *